US012664926B2

(12) United States Patent
Kim et al.

(10) Patent No.: US 12,664,926 B2
(45) Date of Patent: Jun. 23, 2026

(54) DISPLAY DEVICE AND CONTROL METHOD THEREOF WITH REFRESH RATE OPTIMIZATION

(71) Applicant: SAMSUNG ELECTRONICS CO., LTD., Suwon-si (KR)

(72) Inventors: Sungho Kim, Suwon-si (KR); Bupmyoung Kim, Suwon-si (KR); Hyesung Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/065,650

(22) Filed: Feb. 27, 2025

(65) Prior Publication Data

US 2025/0201168 A1 Jun. 19, 2025

Related U.S. Application Data

(63) Continuation of application No. PCT/KR2023/011692, filed on Aug. 8, 2023.

(30) Foreign Application Priority Data

Sep. 26, 2022 (KR) ........................ 10-2022-0121981

(51) Int. Cl.

*G09G 3/20* (2006.01)
*G09G 3/34* (2006.01)
*G09G 3/36* (2006.01)

(52) U.S. Cl.

CPC ......... *G09G 3/2092* (2013.01); *G09G 3/3406* (2013.01); *G09G 3/3607* (2013.01);
(Continued)

(58) Field of Classification Search

CPC .................................................... G09G 3/3406
See application file for complete search history.

(56) References Cited

U.S. PATENT DOCUMENTS 7,123,246 B2 10/2006 Nakatani et al.
7,737,918 B2 6/2010 Jeong
(Continued)

FOREIGN PATENT DOCUMENTS

CN 102629444 A 8/2012
CN 102651187 A 8/2012
(Continued)

OTHER PUBLICATIONS

International Search Report (PCT/ISA/210) issued by the International Searching Authority on Dec. 5, 2023 in corresponding International Application No. PCT/KR2023/011692.
(Continued)

*Primary Examiner* — Gustavo Polo
(74) *Attorney, Agent, or Firm* — Sughrue Mion, PLLC

(57) ABSTRACT

A display device includes: a display panel including a plurality of pixels connected to a plurality of gate lines; a main controller configured to process a source signal and output an image signal; and a timing controller configured to output a driving signal to drive the display panel based on the image signal, where the main controller is configured to: divide a screen of the display panel into a plurality of regions based on an amount of data change of the source signal, and output the image signal to display an image at different refresh rates in each of the plurality of regions.

10 Claims, 8 Drawing Sheets

(52) U.S. Cl.
CPC ... *G09G 3/3677* (2013.01); *G09G 2300/0408* (2013.01); *G09G 2310/061* (2013.01); *G09G 2310/08* (2013.01); *G09G 2320/0233* (2013.01); *G09G 2320/0666* (2013.01); *G09G 2320/0686* (2013.01); *G09G 2330/023* (2013.01); *G09G 2340/0435* (2013.01)

(56) References Cited

U.S. PATENT DOCUMENTS

| | | | | |
|---|---|---|---|---|
| 8,532,248 | B2 | 9/2013 | Li et al. | |
| 8,983,021 | B2 | 3/2015 | Chen | |
| 9,053,678 | B2 | 6/2015 | Li et al. | |
| 9,704,215 | B2 | 7/2017 | Kim et al. | |
| 9,837,031 | B2 | 12/2017 | You | |
| 9,952,711 | B2 | 4/2018 | Kim et al. | |
| 10,565,936 | B2 | 2/2020 | Ryu et al. | |
| 11,037,477 | B2 | 6/2021 | Choi et al. | |
| 11,049,451 | B2 | 6/2021 | Park et al. | |
| 11,341,932 | B2 | 5/2022 | Choi et al. | |
| 11,361,734 | B2 | 6/2022 | Bae et al. | |
| 11,410,584 | B2 | 8/2022 | Kim et al. | |
| 11,735,141 | B2 | 8/2023 | Choi et al. | |
| 2011/0221798 | A1 | 9/2011 | Cummings | |
| 2013/0088265 | A1 | 4/2013 | Chen | |
| 2015/0084998 | A1 | 3/2015 | Sampsell | |
| 2015/0243203 | A1 | 8/2015 | Kim et al. | |
| 2020/0371734 | A1 | 11/2020 | Kawano et al. | |
| 2022/0122545 | A1 | 4/2022 | Hong et al. | |
| 2023/0169937 | A1 | 6/2023 | Choi | |
| 2025/0166575 | A1* | 5/2025 | Huang ................. | G09G 3/3266 |

FOREIGN PATENT DOCUMENTS

| | | | |
|---|---|---|---|
| CN | 102654982 | A | 9/2012 |
| CN | 102789770 | A | 11/2012 |
| CN | 113284459 | A | 8/2021 |
| EP | 3792906 | A1 | 3/2021 |
| JP | 3749147 | B2 | 2/2006 |
| JP | 4723328 | B2 | 7/2011 |
| JP | 6413560 | B2 | 10/2018 |
| JP | 2020-34869 | A | 3/2020 |
| JP | 2020-190940 | A | 11/2020 |
| JP | 2023-44059 | A | 3/2023 |
| KR | 10-2005-0023773 | A | 3/2005 |
| KR | 10-1158876 | B1 | 6/2012 |
| KR | 10-1201320 | B1 | 11/2012 |
| KR | 10-2016-0094114 | A | 8/2016 |
| KR | 10-2018-0015038 | A | 2/2018 |
| KR | 10-2018-0065194 | A | 6/2018 |
| KR | 10-1958449 | B1 | 3/2019 |
| KR | 10-2020-0037530 | A | 4/2020 |
| KR | 10-2021-0013477 | A | 2/2021 |
| KR | 10-2257370 | B1 | 5/2021 |
| KR | 10-2021-0075851 | A | 6/2021 |
| KR | 10-2021-0082865 | A | 7/2021 |
| KR | 10-2021-0121325 | A | 10/2021 |
| KR | 10-2022-0019393 | A | 2/2022 |
| KR | 10-2022-0057262 | A | 5/2022 |
| KR | 10-2552964 | B1 | 7/2023 |

OTHER PUBLICATIONS

Written Opinion (PCT/ISA/237) issued by the International Searching Authority on Dec. 5, 2023 in corresponding International Application No. PCT/KR2023/011692.

Communication issued Jan. 29, 2026 by the Korean Ministry of Intellectual Property in Korean Patent Application No. 10-2022-0121981.

* cited by examiner

DISPLAY DEVICE AND CONTROL METHOD THEREOF WITH REFRESH RATE OPTIMIZATION

CROSS-REFERENCE TO RELATED APPLICATION(S)

This application is a continuation of International Application No. PCT/KR2023/011692, filed on Aug. 8, 2023, in the Korean Intellectual Property Receiving Office, which is based on and claims priority to Korean Patent Application No. 10-2022-0121981, filed on Sep. 26, 2022, in the Korean Intellectual Property Office, the disclosures of which are incorporated by reference herein in their entireties.

BACKGROUND

1. Field

The disclosure relates to a display device and a method for controlling the same.

2. Description of Related Art

In general, a display device may be an output device that visually displays acquired or stored image information to a user, and may be used in various fields such as a home or work place.

For example, display devices may be monitor devices connected to personal computers or servers, portable computer systems, navigation devices, general television sets, Internet protocol televisions (IPTVs), portable terminals such as smartphones, tablet personal computers (PCs), personal digital assistants (PDAs), and cellular phones, various display devices used for reproducing images such as advertisements or films, or other types of audio/video systems.

The display device may display images using various types of display panels. For example, the display device may include a cathode ray tube panel, a light emitting diode (LED) panel, an organic light emitting diode (OLED) panel, a liquid crystal display (LCD) panel, and the like.

In the display device, data lines and gate lines may intersect, and a plurality of pixels corresponding to the points where the data lines and the gate lines intersect may be arranged in a matrix form. In this instance, the plurality of pixels may receive data signals from the data lines and are provided with scan signals to receive data voltages corresponding to each pixel.

SUMMARY

Provided are a display device capable of outputting different refresh rates for each region of a screen of a display panel, and a method for controlling the display device.

Additional aspects will be set forth in part in the description which follows and, in part, will be apparent from the description, or may be learned by practice of the presented embodiments.

According to an aspect of an embodiment, a display device may include: a display panel including a plurality of pixels connected to a plurality of gate lines; a main controller configured to process a source signal and output an image signal; and a timing controller configured to output a driving signal to drive the display panel based on the image signal, where the main controller is configured to: divide a screen of the display panel into a plurality of regions based on an amount of data change of the source signal, and output the image signal to display an image at different refresh rates in each of the plurality of regions.

The main controller may be configured to divide the screen of the display panel into a first region corresponding to a first refresh rate based on the amount of data change being less than a preset reference, and a second region corresponding to a second refresh rate higher than the first refresh rate based on the amount of data change being greater than or equal to the preset reference.

The display device may further include: a scan driver including a plurality of switches at a plurality of output terminals and configured to sequentially output gate signals to the plurality of gate lines via the plurality of switches, where the timing controller is configured to output the driving signal to control the plurality of switches to display the image at different refresh rates in each of the plurality of regions.

The timing controller may be configured to, in a first frame: control the plurality of switches to turn off based on a gate signal input to a first gate line corresponding to the first region, and control the plurality of switches to turn on based on a gate signal input to a second gate line corresponding to the second region.

The timing controller may be configured to, in a second frame in sequence to the first frame, control the plurality of switches to turn on based on a gate signal input to the plurality of gate lines corresponding to the plurality of regions.

The timing controller may be configured to control a switch connected to the first region to periodically turn on and turn off according to the image signal, and control a switch connected to the second region to maintain an on state, among the plurality of switches.

According to an aspect of an embodiment, provided is a method for controlling a display device including a display panel including a plurality of pixels connected to a plurality of gate lines, a main controller configured to process a source signal and output an image signal, and a timing controller configured to output a driving signal to drive the display panel based on the image signal, the method may include: dividing, by the main controller, a screen of the display panel into a plurality of regions based on an amount of data change of the source signal; and outputting the image signal to display an image at different refresh rates in each of the plurality of regions.

The dividing the screen into the plurality of regions may include dividing the screen into a first region corresponding to a first refresh rate based on the amount of data change being less than a preset reference, and a second region corresponding to a second refresh rate higher than the first refresh rate based on the amount of data change being greater than or equal to the preset reference.

The display device further includes a scan driver including a plurality of switches at a plurality of output terminals, the method may further include: sequentially outputting, by the scan driver, gate signals to the plurality of gate lines via the plurality of switches; and outputting the driving signal to control the plurality of switches to display the image at different refresh rates in each of the plurality of regions.

The outputting of the driving signal may further include, in a first frame, controlling the plurality of switches to turn off based on a gate signal input to a first gate line corresponding to the first region, and controlling the plurality of switches to turn on based on a gate signal input to a second gate line corresponding to the second region.

The outputting the driving signal may further include, in a second frame in sequence to the first frame, controlling the plurality of switches to turn on based on a gate signal input to the plurality of gate lines corresponding to the plurality of regions.

The outputting the driving signal may further include controlling a switch connected to the first region according to the image signal to periodically turn on and turn off, and controlling a switch connected to the second region to maintain an on state, among the plurality of switches.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
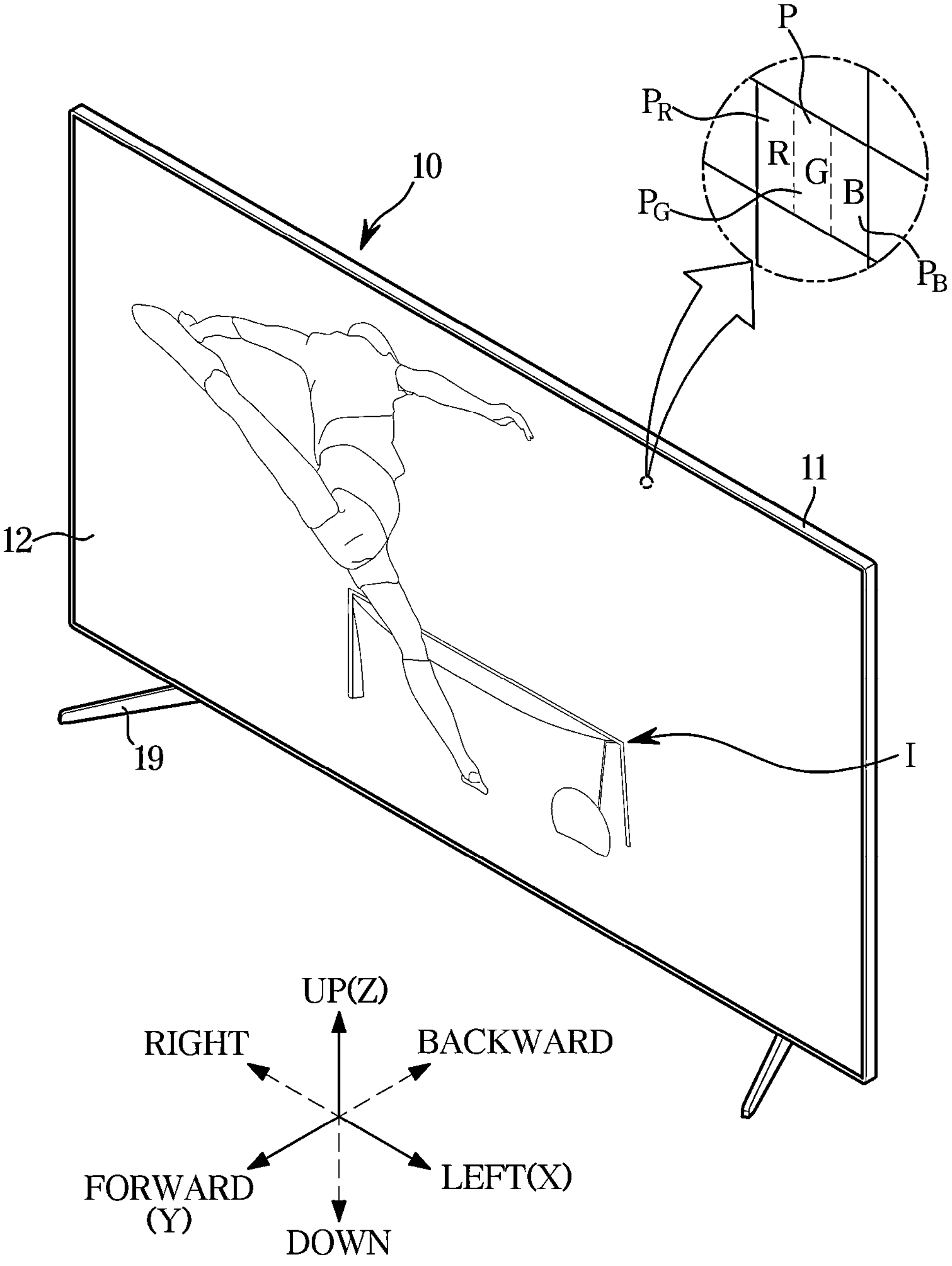
FIG. 1 is a perspective view of an example exterior of a display device according to an embodiment.

Embodiments described in the disclosure and configurations shown in the drawings are merely examples of the embodiments of the disclosure, and may be modified in various different ways at the time of filing of the application to replace the embodiments and drawings of the disclosure.

In addition, terms used herein are for describing embodiments only and are not intended to limit the disclosure. It will be understood that the singular forms are intended to include the plural forms as well, unless the context clearly dictates otherwise.

It will be understood that the terms "include", "comprise", and "have" when used in this specification, specify the presence of stated features, integers, steps, operations, elements, and/or components, but do not preclude the presence or addition of one or more other features, integers, steps, operations, elements, components, and/or groups thereof.

In addition, terms such as "~part", "~device", "~block", "~member", "~module", and the like may refer to a unit for processing at least one function or act. For example, the terms may refer to at least one process processed by at least one hardware, such as field-programmable gate array (FPGA)/application specific integrated circuit (ASIC), software stored in memories or processors.

In addition, it will be understood that, although the terms first, second, etc. may be used herein to describe various elements, these elements should not be limited by these terms.

Reference numerals used for method steps are just used for convenience of explanation, but not to limit an order of the steps. Thus, unless the context clearly dictates otherwise, the written order may be practiced otherwise.

The term "at least one" used herein includes any and all combinations of the associated listed items. For example, it will be understood that the term "at least one of A, B, or C" may include only A, only B, only C, both A and B, both A and C, both B and C, or all of A, B and C.

Hereinafter, embodiments of a display device and a method for controlling the same according to one or more embodiments of the disclosure will be described in detail with reference to the accompanying drawings.

FIG. 1 is a perspective view of an example exterior of a display device according to an embodiment.

A display device 10 according to an embodiment may process an image signal received from the outside and visually display a processed image. Hereinafter, a case in which the display device 10 is a television (TV) is exemplified, but is not limited thereto.

For example, the display device 10 may be implemented in various forms, such as a monitor, a portable multimedia device, a portable communication device, and the like, and the type of the display device 10 is not limited as long as it is a device that visually displays an image.

In addition, the display device 10 may be a large format display (LFD) installed outdoors, such as one a roof of a building or at a bus stop. The outdoors is not necessarily limited to the outdoors, and the display device 10 may be installed wherever a large number of people may enter and exit, even indoors such as at subway stations, shopping malls, movie theaters, office buildings, and stores.

The display device 10 may receive content including video and audio signals from various content sources and may output video and audio corresponding to the video and audio signals. For example, the display device 10 may receive content data through a broadcast reception antenna or a wired cable, receive content data from a content playback apparatus, or receive content data from a content-providing server of a content provider.

As shown in FIG. 1, the display device 10 may include a body 11 and a screen 12 displaying an image I.

The body 11 may form an exterior of the display device 10, and inside the body 11, components configured to allow the display device 10 to display the image I or perform various functions may be provided. The body 11 shown in FIG. 1 has a flat plate shape, but the shape of the body 11 is not limited to that shown in FIG. 1. For example, the body 11 may have a curved plate shape.

The screen 12 may be formed on a front side of the body 11 and may display the image I. For example, the screen 12 may display a still image or a video. In addition, the screen 12 may display a two-dimensional (2D) plane image or a three-dimensional (3D) stereoscopic image using binocular parallax of a user.

The screen 12 may include, for example, a self-luminous panel (e.g., a light-emitting diode panel or an organic light-emitting diode panel) capable of directly emitting light, or a non-luminous panel (e.g., a liquid crystal panel) capable of transmitting or blocking light emitted by a light source device (e.g., a backlight unit).

A plurality of pixels P may be formed on the screen 12, and the image I displayed on the screen 12 may be formed by light emitted from each of the plurality of pixels P. For example, the image I may be formed on the screen 12 by combining light emitted from the plurality of pixels P.

Each of the plurality of pixels P may emit light of various brightness and various colors. For example, each of the plurality of pixels P may include sub-pixels PR, PG, and PB in order to emit light of various colors.

The sub-pixels PR, PG, and PB may include a red sub-pixel PR capable of emitting red light, a green sub-pixel PG capable of emitting green light, and a blue sub-pixel PB capable of emitting blue light.

For example, the red light may represent light having a wavelength of approximately 620 nm to 750 nm, the green light may represent light having a wavelength of approximately 495 nm to 570 nm, and the blue light may represent light having a wavelength of approximately 450 nm to 495 nm.

By combining the red light of the red sub-pixel PR, the green light of the green sub-pixel PG, and the blue light of the blue sub-pixel PB, each of the plurality of pixels P may emit light of various brightness and various colors.

Figure 2:
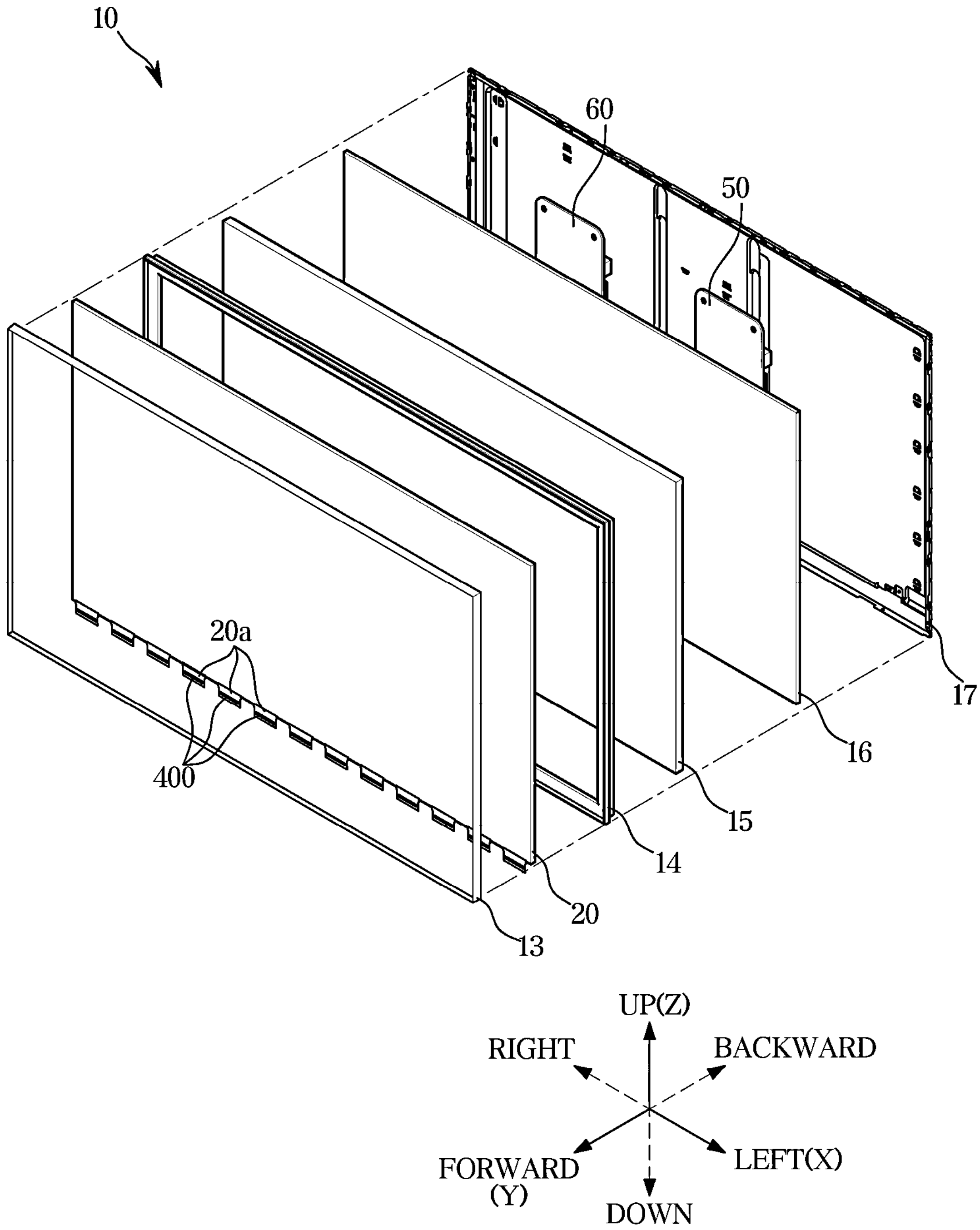
FIG. 2 is an exploded perspective view of an example structure of a display device according to an embodiment.
Figure 3:
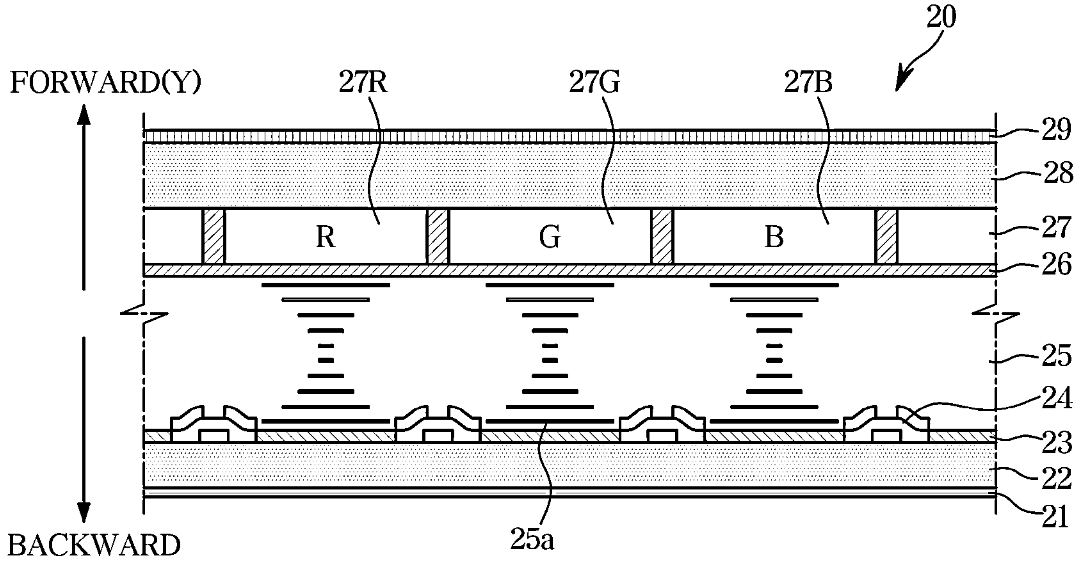
FIG. 3 is a side cross-sectional view of an example liquid crystal panel included in a display device according to an embodiment.

FIG. 2 is an exploded perspective view of an example structure of a display device according to an embodiment. FIG. 3 is a side cross-sectional view of an example liquid crystal panel included in a display device according to an embodiment. The display device 10 described below is a non-luminous display device including a liquid crystal panel and a backlight unit.

As shown in FIG. 2, various components for generating an image I on the screen 12 may be provided in the body 11.

For example, the body 11 may include a backlight unit 15 which is a surface light source, a liquid crystal panel 20 that blocks or transmits light emitted from the backlight unit 15, a control assembly 50 that controls operations of the backlight unit 15 and the liquid crystal panel 20, and a power supply assembly 60 that supplies power to the backlight unit 15 and the liquid crystal panel 20.

The body 11 may include a bezel 13, a frame middle mold 14, a bottom chassis 16, and a rear cover 17 for supporting the liquid crystal panel 20, the backlight unit 15, the control assembly 50, and the power supply assembly 60.

The backlight unit 15 may include a point light source that emits monochromatic light or white light. In addition, the backlight unit 15 may refract, reflect, and scatter the light to convert the light emitted from the point light source into a uniform surface light. As such, the backlight unit 15 may emit uniform surface light in a forward direction by refracting, reflecting, and scattering the light emitted from the point light source. The backlight unit 15 is described in more detail below.

The liquid crystal panel 20 may be provided in front of the backlight unit 15, and may block or transmit light emitted from the backlight unit 15 to form the image I.

A front surface of the liquid crystal panel 20 may form the screen 12 of the display device 10 described above, and the liquid crystal panel 20 may include a plurality of pixels P. The plurality of pixels P included in the liquid crystal panel 20 may independently block or transmit the light emitted from the backlight unit 15, and the light transmitted through the plurality of pixels P may form the image I to be displayed on the screen 12. The plurality of pixels P may be arranged in a two-dimensional matrix form.

Referring to FIG. 3, the liquid crystal panel 20 may include a first polarizing film 21, a first transparent substrate 22, a pixel electrode 23, a thin-film transistor (TFT) 24, a liquid crystal layer 25, a common electrode 26, a color filter 27, a second transparent substrate 28, and a second polarizing film 29.

The first transparent substrate 22 and the second transparent substrate 28 may support the pixel electrode 23, the TFT 24, the liquid crystal layer 25, the common electrode 26, and the color filter 27. The first transparent substrate 22 and the second transparent substrate 28 may be formed of tempered glass or transparent resin.

The first polarizing film 21 and the second polarizing film 29 may be provided on outer surfaces of the first and second transparent substrates 22 and 28, respectively. The first polarizing film 21 and the second polarizing film 29 may each transmit specific polarized light and block other polarized light.

For example, the first polarizing film 21 may transmit polarized light in a first direction while blocking the other polarized light. The second polarizing film 29 may transmit polarized light in a second direction while blocking the other polarized light. In this instance, the first and second directions may be perpendicular to each other. Accordingly, the polarized light passing through the first polarizing film 21 may not pass through the second polarizing film 29.

The color filter 27 may be provided on an inner side of the second transparent substrate 28. The color filter 27 may include a red filter 27R to transmit red light, a green filter 27G to transmit green light, and a blue filter 27B to transmit blue light.

The red filter 27R, the green filter 27G, and the blue filter 27B may be disposed parallel to each other. A region in which the color filter 27 is formed may correspond to the pixel P described above. A region in which the red filter 27R is formed may correspond to the red sub-pixel PR, a region in which the green filter 27G is formed may correspond to the green sub-pixel PG, and a region in which the blue filter 27B is formed may correspond to the blue sub-pixel PB.

The pixel electrode 23 may be provided on an inner side of the first transparent substrate 22, and the common electrode 26 may be provided on the inner side of the second transparent substrate 28. The pixel electrode 23 and the common electrode 26 may be formed of a metal material through which electricity is conducted, and may generate an electric field for changing the arrangement of liquid crystal molecules constituting the liquid crystal layer 25.

The TFT 24 may be provided on the inner side of the second transparent substrate 112. The TFT 24 may pass or block the current flowing in the pixel electrode 23. For example, by turning the TFT 24 on (closing) or off (opening), an electric field may be formed or removed from between the pixel electrode 23 and the common electrode 26.

The liquid crystal layer 25 may be formed between the pixel electrode 23 and the common electrode 26 and is filled with the liquid crystal molecules 25*a*. Liquid crystal may be in an intermediate state between solid (crystal) and liquid. The liquid crystal may exhibit optical properties depending on a change in electric field. For example, an arrangement direction of the molecules constituting the liquid crystal may change depending on the change of the electric field. The optical properties of the liquid crystal layer 25 may change according to the presence or absence of an electric field passing through the liquid crystal layer 25.

Referring back to FIG. 2, on one side of the liquid crystal panel 20, provided may be a cable 20*a* for transmitting image data to the liquid crystal panel 20 and a display driver integrated circuit 400 (DDI, hereinafter referred to as 'panel driver') for processing digital image data to output an analog image signal.

The cable 20*a* may electrically connect the panel driver 400 to the control assembly 50 and the power supply assembly 60. Further, the cable 20*a* may electrically connect the panel driver 400 and the liquid crystal panel 20. The cable 20*a* may be a bendable flexible flat cable, a film cable, or the like.

The panel driver 400 may receive image data from the control assembly 50 and may receive power from the power supply assembly 60 through the cable 20*a*. In addition, the panel driver 400 may provide image data and drive current to the liquid crystal panel 20 through the cable 20*a*.

The cable 20*a* and the panel driver 400 may be integrally provided. For example, the cable 20*a* and the panel driver 400 may be implemented as a chip on film (COF) or a table carrier package (TCP). In other words, the panel driver 400 may be disposed on the cable 20*a*, without being limited thereto. The panel driver 400 may be disposed on the liquid crystal panel 20.

Figure 4:
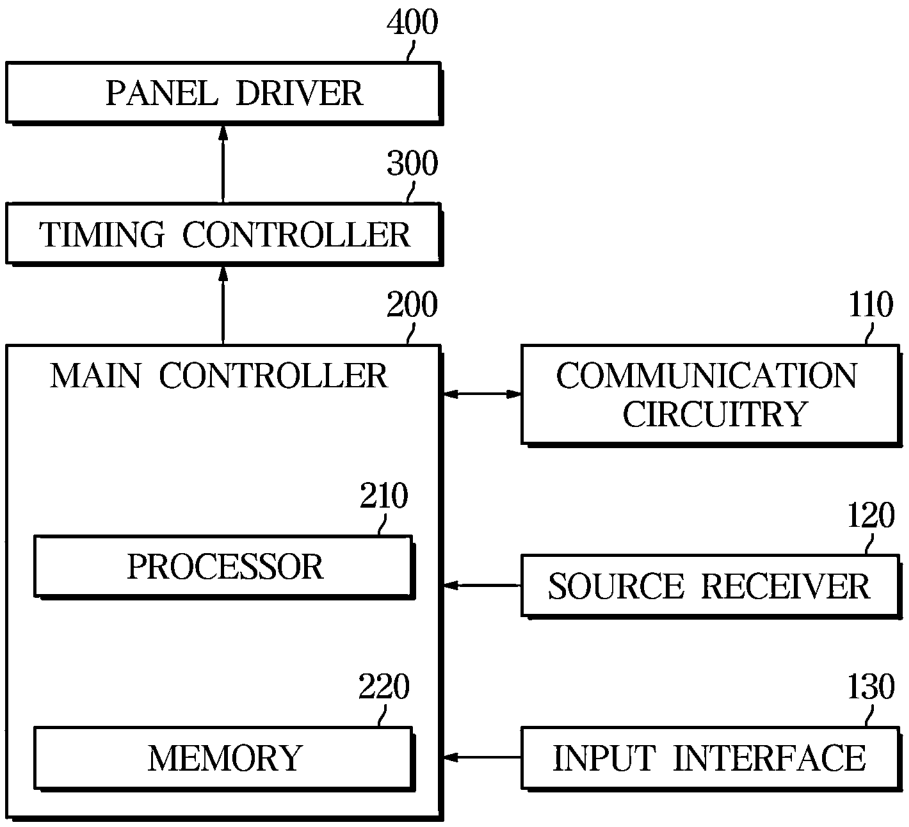
FIG. 4 is a control block diagram of a display device according to an embodiment.

FIG. 4 is a control block diagram of a display device according to an embodiment.

Referring to FIG. 4, the display device 10 may include communication circuitry 110, a source receiver 120, an input interface 130, a main controller 200, a timing controller 300, and the panel driver 400.

The communication circuitry 110, the source receiver 120, the input interface 130, the main controller 200, and the timing controller 300 may be provided in the above-described control assembly. The components of the display device 10 may be electrically connected to each other.

The communication circuitry 110 may communicate with an external device (e.g., a server, and a smartphone). The communication circuitry 110 may include wireless communication circuitry to which various wireless communication technologies are applied such as 3G communication, 4G communication, wireless local area network (LAN), Wi-Fi, Bluetooth, Zigbee, Wi-Fi Direct (WFD), ultra-wide band (UWB), infrared communication, Bluetooth low energy (BLE), near field communication (NFC) and/or Z-Wave. In addition, the communication circuitry 110 may include wired communication circuitry to which a wired communication technology, such as peripheral component interconnect (PCI), PCI-express, and/or universe serial bus (USB), is applied.

The source receiver 120 may receive a source signal including image data and/or audio data from an external content source. For example, the source receiver 120 may include various types of terminals such as a component (YPbPr/RGB) terminal, a composite video blanking and sync (CVBS) terminal, an audio terminal, a high-definition multimedia interface (HDMI) terminal, and a universal serial bus (USB) terminal.

The source receiver 120 may transmit the source signal received from the external content source to the main controller 200.

The input interface 130 may include various physical buttons and/or touch buttons provided on one area of the display device 10. In a case where the display panel includes a touch screen panel, the display panel may serve as the input interface 130. Further, the input interface 130 may be implemented as a remote controller. The input interface 130 may obtain a user input for controlling the display device 10, for example, power on, power off, volume control, channel control, screen control, and various setting changes of the display device 10.

The main controller 200 may control operations of electronic components included in the display device 10. The main controller 200 may include a processor 210 and a memory 220. The processor 210 may generate an image signal, an audio signal, and/or a control signal for controlling the operation of the display device 10 based on instructions, applications, data, and/or programs stored in the memory 220.

The image signal and control signal generated by the main controller 200 may be output to the timing controller 300. The processor 210 may include a logic circuit and an arithmetic circuit in hardware. The memory 220 and the processor 210 may be implemented as one control circuit or as a plurality of circuits.

The memory 220 may store various information required for operation of the display device 10. The memory 220 may store programs, data, instructions, software and/or applications for controlling the operation of the display device 10.

The memory 220 may include a volatile memory such as a static random access memory (S-RAM) or a dynamic random access memory (D-RAM) for temporarily storing data. In addition, the memory 220 may include a non-volatile memory such as a read only memory (ROM), an erasable programmable read only memory (EPROM), or an electrically erasable programmable read only memory (EEPROM) for long-term storage of data.

The main controller 200 may process a source signal input through the source receiver 120 to generate an image signal corresponding to the input source signal. For example, the main controller 200 may include a source decoder, a scaler, an image enhancer, and a graphics processor. The source decoder may decode a source signal compressed in a format such as moving picture experts group (MPEG), and the scaler may output image data at a desired resolution by resolution conversion.

The main controller 200 may detect the amount of data change of the source signal. The data of the source signal may include RGB color, saturation, brightness, and the like, and the main controller detects the amount of data change in the RGB color values, saturation values, brightness values, and the like, and determines the amount of data change of the source signal.

The main controller 200 may divide a screen of the display panel into a plurality of regions based on the detected amount of data change. For example, the main controller 200 may divide the screen of the display panel into an upper part as a first region and a lower part as a second region based on the amount of change in the RGB color values, saturation values, and brightness values.

In addition, the main controller 200 may divide the screen into the first region (e.g., a stationary region without image change in each frame) in a case where the detected amount of change in the RGB color values, saturation values, and brightness values is less than a preset reference, and the second region (e.g., a motion region where images are different in each frame) in a case where the detected amount of change in the RGB color values, saturation values, and brightness values is greater than or equal to the preset reference.

The main controller 200 may output an image signal to allow the screen of the display panel to be displayed at different refresh rates in each of the divided regions. For example, the main controller 200 may output an image signal to allow the screen of the display panel to be displayed at a first refresh rate in the first region, and may output an image signal to allow the screen of the display panel to be displayed at a second refresh rate in the second region.

The second refresh rate is higher than the first refresh rate. For example, the first refresh rate may be 30 Hz, and the second refresh rate may be 120 Hz. By displaying an image at different refresh rates in each of the regions according to the embodiment, power consumption may be reduced.

The main controller 200 may transmit, to the timing controller 300, the image signals for displaying the image at different refresh rates in the first region and the second region of the display panel screen.

The timing controller 300 may receive the image signals from the main controller 200 and generate a driving signal for controlling the driving of the display panel based on the image signals.

The timing controller 300 may transmit the driving signal to the panel driver 400 of the display panel. The driving signal generated by the timing controller 300 may include a scan control signal for controlling the operation of a scan driver 410, a data control signal for controlling the operation of a data driver 420, and a control signal for controlling the operation of a plurality of switches 411. The timing controller 300 may include a processor and a memory.

Figure 5:
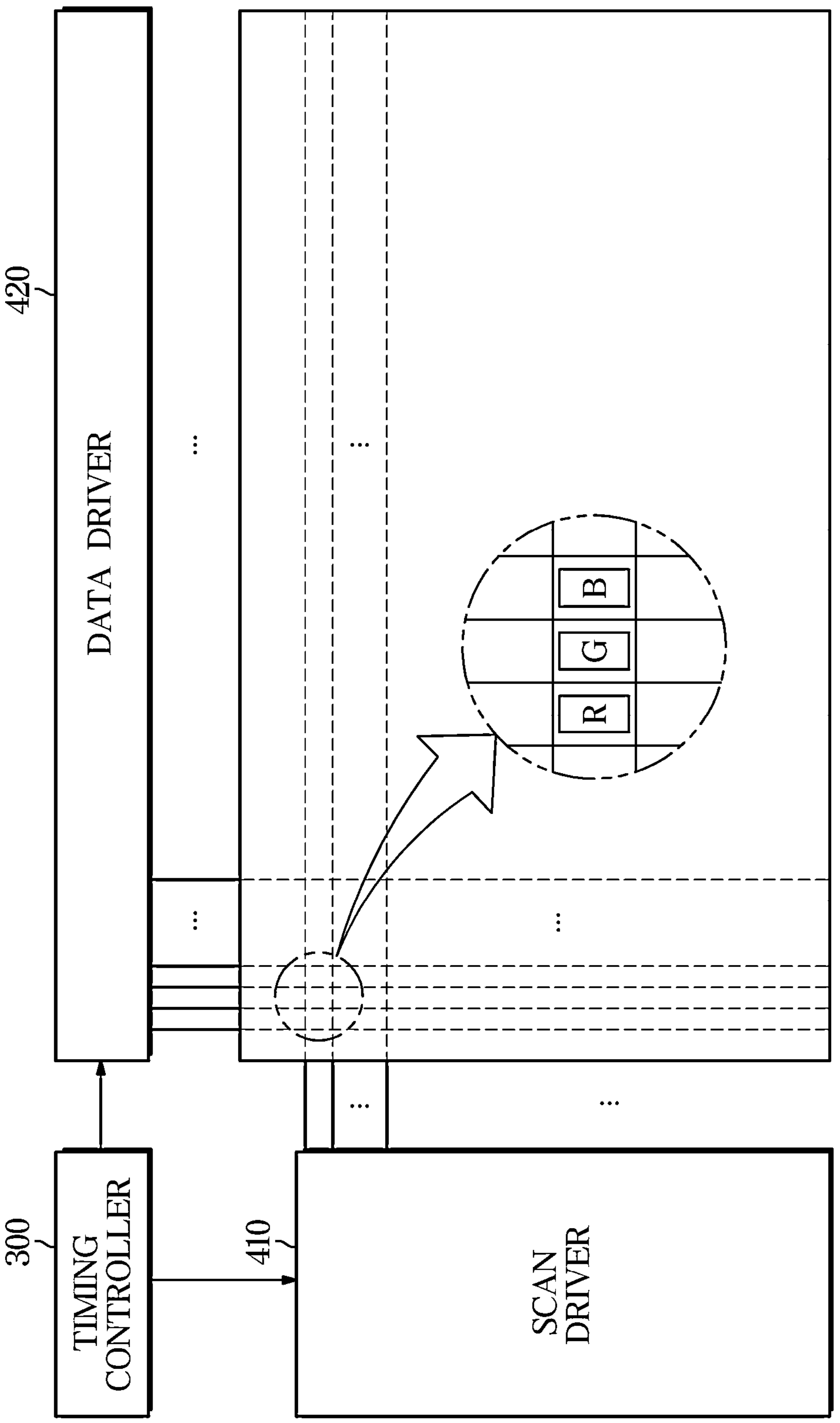
FIG. 5 is a diagram illustrating driving of pixels of a display panel according to an embodiment.

FIG. 5 is a diagram illustrating driving of pixels of a display panel according to an embodiment.

Referring to FIG. 5, the panel driver 400 may include the scan driver 410 and the data driver 420.

The scan driver 410 may output a gate signal to turn a pixel on/off, and the data driver 420 may output a data signal to implement an image.

The scan driver 410 may generate the gate signal based on a timing control signal transmitted from the timing controller 300, and the data driver 420 may generate the data signal based on image data transmitted from the timing controller 300.

By outputting the gate signal by the scan driver 410, the pixel electrode 23 and a data line are electrically connected, and thus, a data voltage may be applied to the pixel electrode 23 through the data line. In addition, depending on a difference between the pixel electrode 23 and the common electrode 26, an arrangement of liquid crystal molecules included in a pixel may change, and a light transmittance of the pixel changes according to the arrangement of the liquid crystal molecules. Further, the pixel realizes a grayscale according to the change in the light transmittance.

Figure 6:
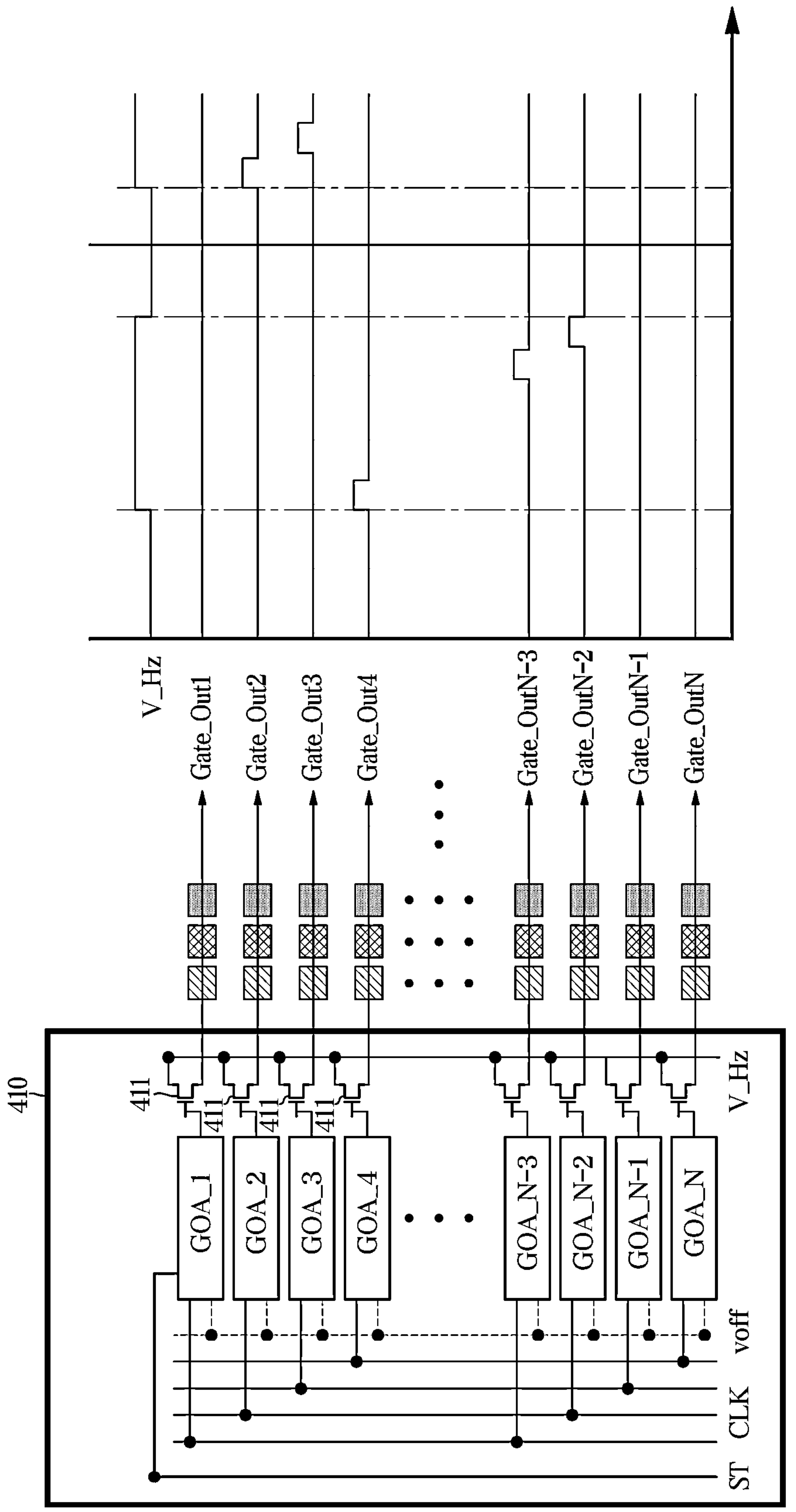
FIG. 6 is a diagram illustrating a circuit in which a gate signal is output in a display device according to an embodiment.

FIG. 6 is a diagram illustrating a circuit in which a gate signal is output in a display device according to an embodiment.

Referring to FIG. 6, the scan driver 410 may include input terminals for receiving clock signals CLK, gate driver on array (GOA) circuits for sequentially outputting gate signals to each gate line from a plurality of gate lines, and a plurality of switches 411.

The GOA circuit may be connected to the input terminal, and the plurality of switches 411 may be arranged at output terminals of the GOA circuits for outputting the gate signals. However, the positions of the plurality of switches are not limited thereto, and may be arranged at positions for controlling the gate signals output from the scan driver 410. For example, the plurality of switches may be arranged at gate lines between the scan driver 410 and the plurality of pixels.

The plurality of switches 411 may be turned on or off by a driving signal V_Hz transmitted from the timing controller 300. For example, the plurality of switches 411 may be turned on when the driving signal V_Hz transmitted from the timing controller 300 is high, and may be turned off when the driving signal V_Hz is low. The plurality of switches 411 may be turned on/off simultaneously by the driving signal V_Hz transmitted from the timing controller 300, and may also be turned on/off individually.

According to an embodiment, in a first frame, the plurality of switches 411 may all be turned off when a gate signal is input to a first gate line corresponding to a first region, and may all be turned on when a gate signal is input to a second gate line corresponding to a second region. In addition, in a second frame adjacent to the first frame, the plurality of switches 411 may all be turned on when a gate signal is input to a plurality of gate lines corresponding to a plurality of regions including the first region and the second region.

In addition, among the plurality of switches 411, a switch connected to the first region may be periodically turned on and off according to an image signal, and a switch connected to the second region may be maintained in an on state.

In a case where the plurality of switches 411 are turned off, the output of the data driver 420 may be limited, thereby reducing power consumption.

Referring to the graph of FIG. 6, the scan driver 410 may output different gate signals for each region according to the driving signal V_Hz transmitted from the timing controller 300. As a result, a refresh rate may be output differently for each region of the display panel screen.

Figure 7:
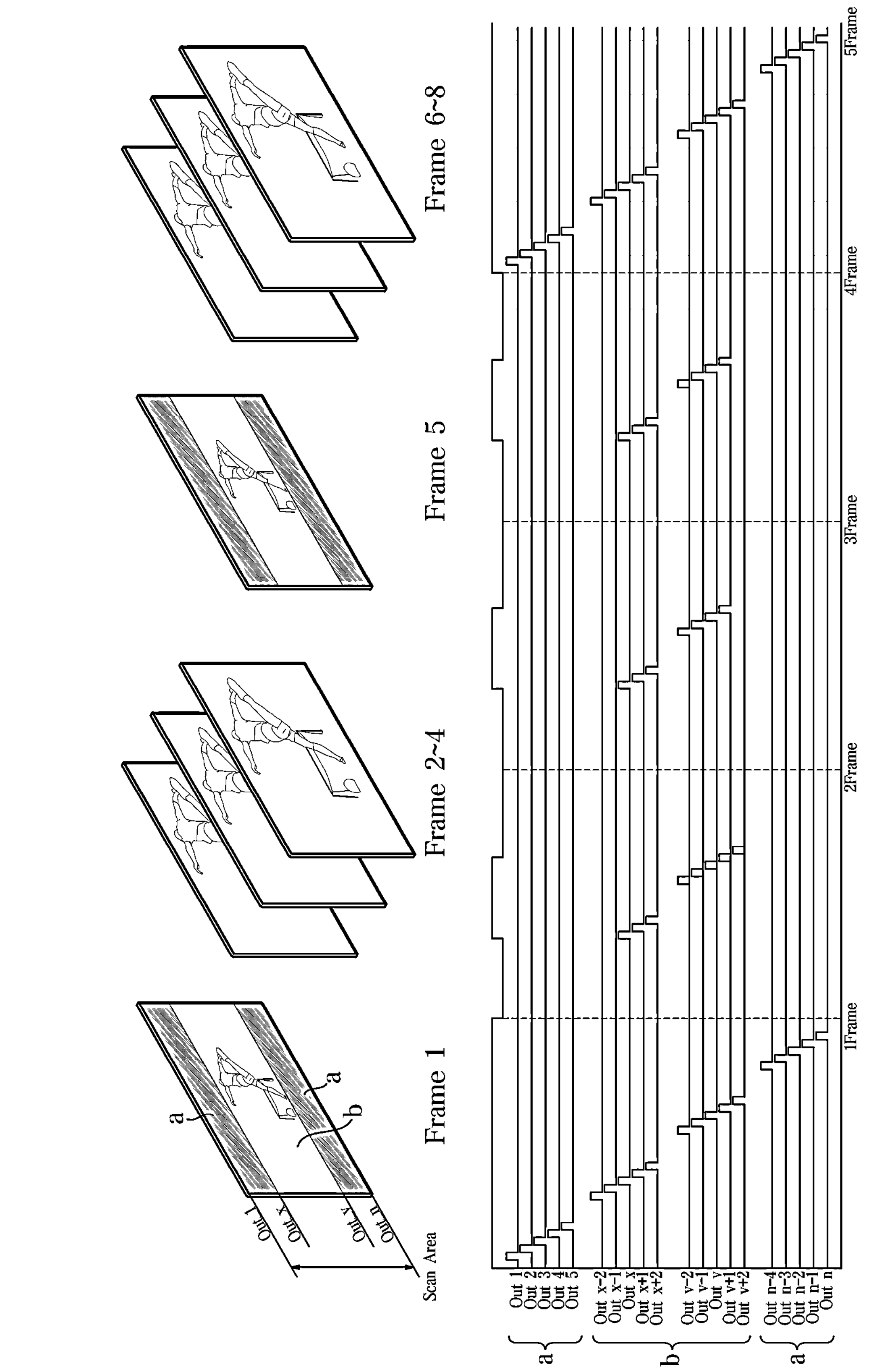
FIG. 7 is a diagram illustrating a screen of a display panel according to an embodiment.

FIG. 7 is a diagram illustrating a screen of a display panel according to an embodiment.

Referring to a display panel of FIG. 7, a region from out1 to out x and a region from out v to out n may be a first region a as a stationary region, and a region from out x to out v may be a second region b as a motion region.

Referring to FIG. 7, on a screen of the display panel, a screen of the entire region may be output in frames 1 and 5, and a screen of the second region b may be output in frames 2 to 4 and frames 6 to 8 from the scan driver 410.

Referring to FIG. 7, the graph shows the gate signals applied to frames 1 to 5. In frames 1 and 5, the gate signals are applied to both the first region a and the second region b, and in frames 2 to 4, the gate signals are applied only to the second region b.

The screen of the display panel may output the entire region of the image in frames 1 and 5, and may output only the second region b in frames 2 to 4.

According to an embodiment, the image may be displayed at different refresh rates in the first region a and the second region b. For example, the image may be displayed at 30 Hz in the first region a, and the image may be displayed at 120 Hz in the second region b.

Figure 8:
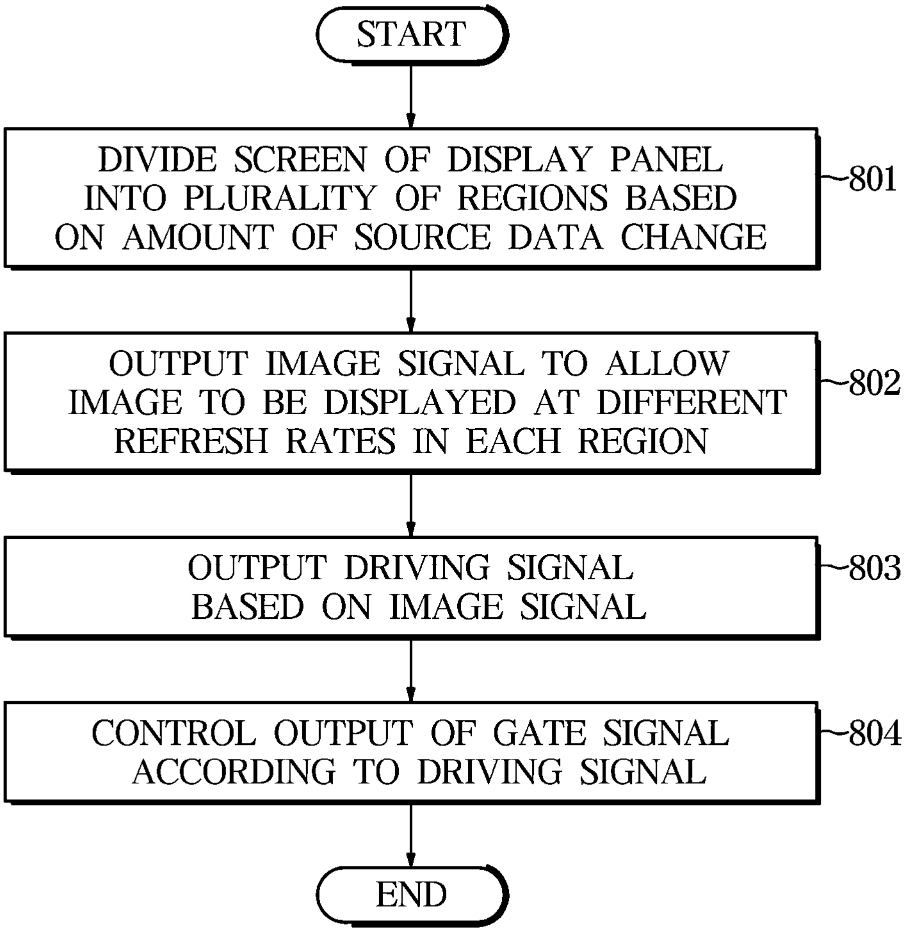
FIG. 8 is a flowchart illustrating a method for controlling a display device according to an embodiment.

FIG. 8 is a flowchart illustrating a method for controlling a display device according to an embodiment.

Referring to FIG. 8, the main controller 200 of the display device 10 may divide a screen of the display panel into a plurality of regions according to the amount of data change in an image source signal (801). For example, the screen of the display panel may be divided into a first region and a second region according to the amount of data change in the image source signal. The first region is a stationary region where the image remains unchanged even when screen frames change, and the second region may be a region other than the first region.

The main controller 200 may output an image signal to allow the screen of the display panel to be displayed at different refresh rates in each of the regions divided according to the amount of data change in the image source signal (802). For example, the main controller 200 may generate an image signal to allow the screen of the display panel to be displayed at a first refresh rate in the first region, and may output an image signal to allow the screen of the display panel to be displayed at a second refresh rate higher than the first refresh rate in the second region.

The timing controller 300 may receive the image signal from the main controller 200, and may output a driving signal for controlling the driving of the display panel based on the image signal (803). The driving signal may include a scan control signal for controlling the operation of the scan driver 410, a data control signal for controlling the operation of the data driver 420, and a control signal for controlling the operation of the plurality of switches 411.

The scan driver 410 may output a gate signal according to the driving signal (804). The scan driver 410 may output the gate signal differently for each region, and thus the display device 10 may output different refresh rates for each of the regions of the display panel screen. In addition, the output of the data driver 420 may also be limited.

According to an embodiment, a display device and a method for controlling the same may minimize power consumption by outputting different refresh rates for each region of a screen.

Meanwhile, one or more embodiments may be implemented in the form of a recording medium that stores instructions executable by a computer. The instructions may be stored in the form of program codes, and when executed by a processor, the instructions may create a program module to perform operations of the disclosed embodiments. The recording medium may be implemented as a computer-readable recording medium.

The computer-readable recording medium may include all kinds of recording media storing instructions that may be interpreted by a computer. For example, the computer-readable recording medium may be read only memory (ROM), random access memory (RAM), a magnetic tape, a magnetic disc, a flash memory, an optical data storage device, etc.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. A display device, comprising:

a display panel comprising a plurality of pixels connected to a plurality of gate lines;

a main controller configured to process a source signal and output an image signal; and a timing controller configured to output a driving signal to drive the display panel based on the image signal, wherein the main controller is further configured to:

detect an amount of data change in the source signal between a plurality of frames based on variations in RGB color values, saturation values, and brightness values, divide a screen of the display panel into a first region, in which amounts of variation in the RGB color values, the saturation values, and the brightness values are less than a preset reference, and a second region, in which the amounts of variation in the RGB color values, the saturation values, and the brightness values are equal to or greater than the preset reference, and output the image signal to display a first image at a first refresh rate in the first region, and to display a second image at a second refresh rate higher than the first refresh rate in the second region.

2. The display device of claim 1, further comprising:

a scan driver comprising a plurality of switches at a plurality of output terminals and configured to sequentially output gate signals to the plurality of gate lines via the plurality of switches, wherein the timing controller is further configured to output the driving signal to control the plurality of switches to display the images at different refresh rates in each of the first region and the second region.

3. The display device of claim 2, wherein the timing controller is further configured to, in a first frame:

control the plurality of switches to turn off based on a gate signal input to a first gate line corresponding to the first region, and control the plurality of switches to turn on based on a gate signal input to a second gate line corresponding to the second region.

4. The display device of claim 3, wherein the timing controller is further configured to, in a second frame in sequence to the first frame:

control the plurality of switches to turn on based on a gate signal input to the plurality of gate lines corresponding to the first region and the second region.

5. The display device of claim 2, wherein the timing controller is further configured to control a switch connected to the first region to periodically turn on and turn off according to the image signal, and control a switch connected to the second region to maintain an on state, among the plurality of switches.

6. A method for controlling a display device comprising a display panel including a plurality of pixels connected to a plurality of gate lines, a main controller configured to process a source signal and output an image signal, and a timing controller configured to output a driving signal to drive the display panel based on the image signal, the method comprising:

detecting an amount of data change in the source signal between a plurality of frames based on variations in RGB color values, saturation values, and brightness values;

dividing, by the main controller, a screen of the display panel into a first region, in which amounts of variation in the RGB color values, the saturation values, and the brightness values are less than a preset reference, and a second region, in which the amounts of variation in the RGB color values, the saturation values, and the brightness values are equal to or greater than the preset reference; and outputting the image signal to display a first image at a first refresh rate in the first region, and to display a second image at a second refresh rate higher than the first refresh rate in the second region.

7. The method of claim 6, wherein the display device further comprises a scan driver including a plurality of switches at a plurality of output terminals, and wherein the method further comprises:

sequentially outputting, by the scan driver, gate signals to the plurality of gate lines via the plurality of switches; and outputting the driving signal to control the plurality of switches to display the images at different refresh rates in each of the first region and the second region.

8. The method of claim 7, wherein the outputting of the driving signal further comprises, in a first frame, controlling the plurality of switches to turn off based on a gate signal input to a first gate line corresponding to the first region, and controlling the plurality of switches to turn on based on a gate signal input to a second gate line corresponding to the second region.

9. The method of claim 8, wherein the outputting the driving signal further comprises, in a second frame in sequence to the first frame, controlling the plurality of switches to turn on based on a gate signal input to the plurality of gate lines corresponding to the first region and the second region.

10. The method of claim 7, wherein the outputting the driving signal further comprises controlling a switch connected to the first region according to the image signal to periodically turn on and turn off, and controlling a switch connected to the second region to maintain an on state, among the plurality of switches.

* * * * *